United States Patent [19]

Bosshart

[11] Patent Number: 5,386,527

[45] Date of Patent: Jan. 31, 1995

[54] METHOD AND SYSTEM FOR HIGH-SPEED VIRTUAL-TO-PHYSICAL ADDRESS TRANSLATION AND CACHE TAG MATCHING

[75] Inventor: Patrick W. Bosshart, Plano, Tex.

[73] Assignee: Texas Instruments Incorporated, Dallas, Tex.

[21] Appl. No.: 815,292

[22] Filed: Dec. 27, 1991

[51] Int. Cl.[6] .................... G06F 12/10; G06F 12/08; G06F 12/00

[52] U.S. Cl. .................................. 395/400; 395/425; 364/DIG. 1; 364/243.41; 364/256.4

[58] Field of Search ............................. 395/400, 425

[56] References Cited

U.S. PATENT DOCUMENTS 4,899,275  2/1990  Sachs et al. ................... 395/425

Primary Examiner—David L. Robertson
Assistant Examiner—Reginald Bragdon
Attorney, Agent, or Firm—Scott B. Stahl; Richard Donaldson

[57] ABSTRACT

A circuit (100) for high-speed virtual-to-physical address translation and cache tag matching comprises a set-associative memory management unit (112) for producing a first predetermined number, N, of candidate physical address signals (132 and 134), and N candidate address hit signals (150 and 152). A set-associative cache (114) produces a second predetermined number M of address tags (168 and 170) and N-by-M array (M00, M01, M10 and M11) of comparison circuits compare the candidate physical addresses (132 and 134) with address tags (168 and 170) gating by the N address hit signals to generate cache hit signals.

19 Claims, 6 Drawing Sheets

METHOD AND SYSTEM FOR HIGH-SPEED VIRTUAL-TO-PHYSICAL ADDRESS TRANSLATION AND CACHE TAG MATCHING

TECHNICAL FIELD OF THE INVENTION

The present invention generally relates to electronic circuitry, and more particularly to a method and system for high-speed virtual-to-physical address translation and cache tag matching for a wide variety of microprocessor applications.

BACKGROUND OF THE INVENTION

The clock cycle of a microprocessor ultimately determines the speed of the microprocessor for its various applications. In microprocessor designs, several timing paths may ultimately determine the clock cycle. Consequently, it is important to optimize all microprocessor timing paths in order to make the clock cycle as fast as possible and, thereby, improve the microprocessor's performance.

One of the critical timing paths for a microprocessor is its memory access timing path. The memory access timing path for a microprocessor is the time that it takes the microprocessor to retrieve data and instructions from a memory. The microprocessor uses these data and instructions in further processing. In numerous applications, microprocessor chips contain on the chip a cache memory. A cache memory temporarily stores data and instructions that the processor has most recently used in the expectation that the processor will use this information again soon. By having the most recently used data and instructions in a cache memory, the microprocessor may rapidly access these data and instructions without having to retrieve them from main memory. For many applications, the cache memory access timing path constitutes a major portion of the total memory access timing path. Therefore, the cache memory timing path often strongly affects critical timing paths for microprocessor processing.

Computer systems use virtual memory to enable them to work on problems in which too much data is present to fit into the available physical memory (RAM). The virtual and physical memory address spaces are divided into blocks called pages. Virtual pages, which are stored on disk, are mapped into physical pages stored in RAM, so that they may be accessed by the computer's CPU. Computer systems use a module called a memory management unit (MMU) to perform this mapping from virtual to physical addresses. This operation is called address translation.

Data and instruction Caches store address tags, which must match the incoming address in order for the cache to successfully return the desired data or instruction. These address tags may consist of either a virtual address or a physical address, depending on the design of the computer system. The CPU operates using virtual addresses. If a cache stores physical address tags, the incoming address to the cache must be a physical address, and therefore suffers a time delay when it is translated from the original virtual address by the MMU.

It is desirable to store virtual address tags rather than physical address tags in the cache to avoid this address translation delay. Therefore, virtually addressed caches can have a smaller total time delay than physically addressed caches. Unfortunately, often software and operating system considerations force the use of physically addressed caches, with their increased delays. With the UNIX operating system in particular, it is usually preferable to use physically addressed caches.

In physically addressed instruction and data caches, address comparison is performed between the address tags stored within the cache and the physical address presented to the cache. If the time delay in generating the physical address is larger than the time delay in fetching the address tag from within the cache, the cache will suffer an additional wait time due to the address translation. A method and system that expedite the combined address translation and cache matching process will reduce the timing path in the cache memory system.

Thus, there is a need for a method and system that reduces the combined address translation and cache matching process time.

SUMMARY OF THE INVENTION

The present invention, accordingly, provides a method and system for high-speed virtual-to-physical address translation and cache tag matching that overcomes or reduces disadvantages and limitations associated with prior virtual-to-physical address translation and cache tag matching circuits.

One aspect of the invention is a high-speed virtual-to-physical translation and cache tag matching circuit that includes a set-associative memory management unit that produces a first predetermined number, N, of candidate physical addresses. The circuit also include a set-associative cache for producing a second predetermined number, M, of address tags. Associated with the memory management unit and the cache is an N-by-M array of comparison circuits that compare candidate physical addresses with address tags to generate an N-by-M array of hit signals. The memory management unit also generates N candidate address hit signals. The present invention further includes circuitry for outputting M of said hit signals in response to the N-by-M array and the N candidate address hit signals.

A technical advantage of the present invention is that it avoids address matching delays that exist in known virtual-to-physical address translation and cache tag matching circuits.

Another technical advantage of the present invention is that it uses a two-way associative memory management unit, while eliminating much of the delay in known memory management units.

Yet another technical advantage of the present invention is that it reduces the critical timing path for the virtual-to-physical translation and cache tag matching to principally one random access memory and one comparison circuit. The result is a much faster circuit for both the translation and matching functions.

BRIEF DESCRIPTION OF THE DRAWINGS

The invention and its modes of use and advantages are best understood by reference to the following description of illustrative embodiments when read in conjunction with the accompanying drawings.

DETAILED DESCRIPTION OF THE INVENTION

The preferred embodiment of the present invention is best understood by referring to the Figures wherein like numerals reference like and corresponding parts of the various drawings.

Figure 1:
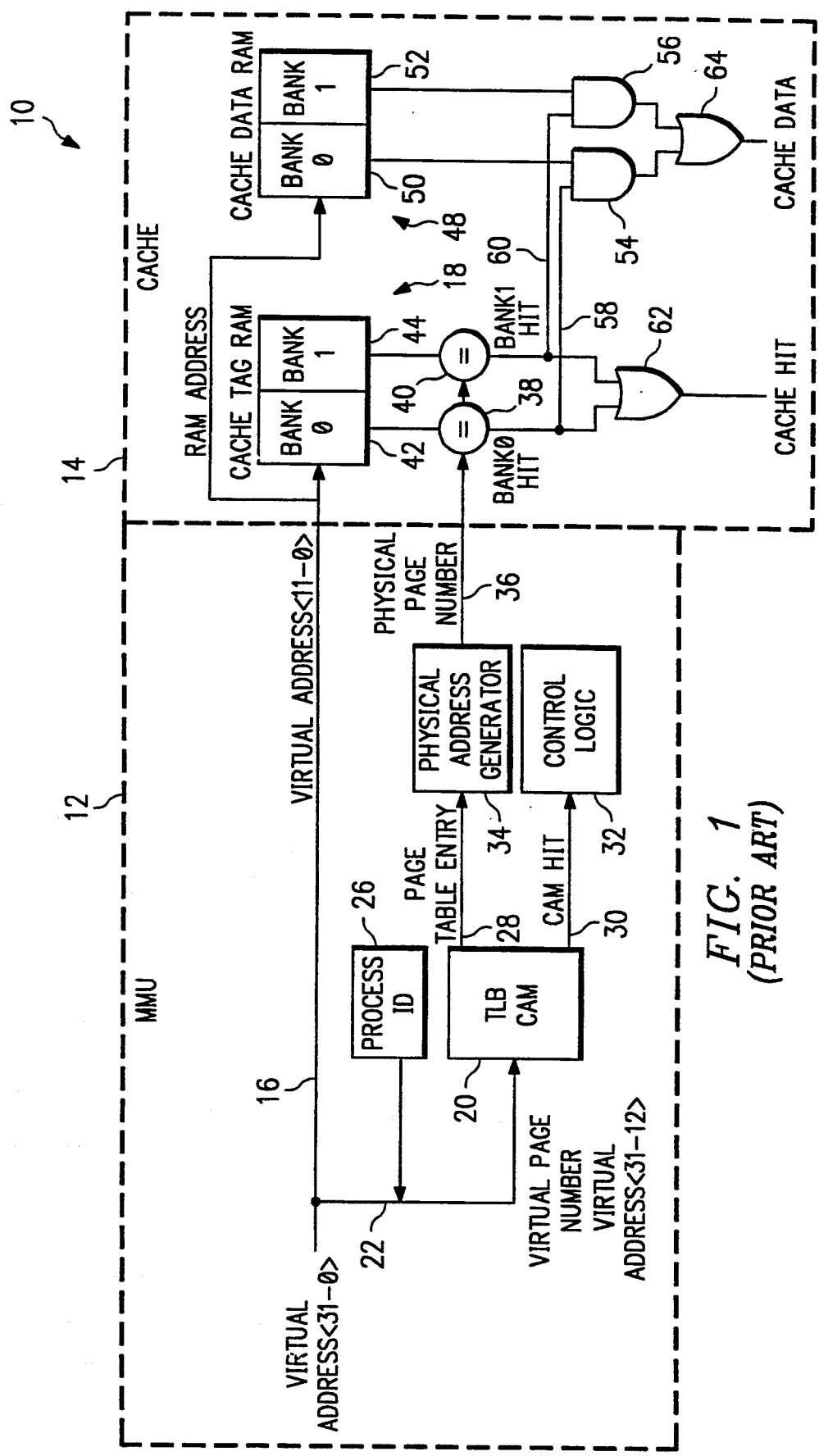
FIG. 1 provides a schematic diagram of a memory management unit and cache according to the prior art.

FIG. 1 shows a memory management unit (MMU) and cache circuit typical of the prior art. The MMU/cache circuit 10 of FIG. 1 includes in MMU 12 a translation lookaside buffer (TLB) 20 that performs virtual-to-physical address translations. TLB CAM 20 usually is a fully associative cache that is implemented using content-addressable memory (CAM) to generate a page table entry (PTE). Physical address generator 34 produces a physical page number from the PTE and sends the high bits (e.g., bits 31 through 12) of the physical address to cache 14. Cache 14 uses the physical address to determine if it contains the data or instructions that the microprocessor needs.

Referring more particularly to FIG. 1, MMU/cache circuit 10 includes MMU 12 and cache circuit 14. MMU 12 may receive a virtual address from a microprocessor (not shown) that, for example, may contain 32 bits of signals on lines 31-0. Of the 32 bits in the virtual address, the bottom 12 bits, (bits 11-0) pass directly through MMU 12 on wire 16 to cache tag RAM 18 of cache 14 and to cache data RAM 48. The top 20 bits (i.e., bits 31-12), of the virtual address go to translation lookaside buffer (TLB) 20 shown within the dash-line box by way of lines 22. Lines 22 feed to TLB CAM 20 and deliver to TLB CAM 20 a virtual page number, for example, the top 20 bits of a 32-bit address. Additionally, the process ID circuit 26 may add to the virtual page number a process identification for TLB CAM 20. TLB CAM 20 outputs a page table entry on lines 28 and a TLB hit signal on line 30. TLB hit signal goes to control logic 32. Page table entries on line 28 go to physical address generator 34.

Physical address generator 34 outputs a physical page number on line 36 to comparator circuits 38 and 40. For example, in the scaleable processor architecture (SPARC) processor chip, the physical address generator is simply a multiplexer that selects either the TLB output or the virtual address according to a particular size boundary. For example, the boundary is at bit 12 for 4 kilobyte pages. The SPARC chip also supports page sizes of 256 kilobytes, 16 megabytes, or 4 gigabytes.

Comparator circuits 38 and 40, respectively, receive cache tag addresses from the BANK 0 42 and BANK 1 44 of cache tag RAM 18. Cache data RAM 48 contains BANK 0 50 and BANK 1 52. Output from BANK 0 50 goes to AND gate 54, while output from BANK 1 52 goes to AND gate 56. AND gate 54 receives BANK 0 hit signal from comparator 38 via line 58, while AND gate 56 receives BANK 1 hit signal from comparator 40 via line 60. BANK 0 hit and BANK 1 hit signals from comparators 38 and 40, respectively, also go to cache hit OR gate 62. Similarly, output from AND gate 54 and AND gate 56 are output as cache data from OR gate 64.

TLB CAM 20 receives a virtual page number that may comprise a virtual address for bits 12 through 31 of a 32-bit virtual address system. In a processor architecture that uses 4 kilobyte pages, the bottom 12 bits of the address do not change in translating from a virtual address to a physical address. These bits are simply offset within the page. The higher bits (e.g., the top 20 bits of a 32 bit address) are the virtual page number in the virtual address and the physical page number for the physical address. In other words, the bottom 12 bits are sent through directly to cache 14, whereas the top 20 bits must go through translation at TLB CAM 20.

The PTE from TLB CAM 20 is a copy of a PTE stored in the main memory page tables that tell the microprocessor how to do the mapping. The PTE includes the physical page number as well as memory access permission bits and the page size for processors that use pages of different size. For example, the SPARC processor not only uses 4 kilobyte pages, but also may use 256 kilobyte, 16 megabyte and 4 gigabyte pages. This page size information is sent to physical address generator 34 to control its selection of the boundary between the physical page number and the page offset.

Cache 14 is implemented typically as a 2-way set-associative cache. This means that the virtual address goes to cache 14 on line 16 to provide its index or RAM address. Using BANK 0 42 and BANK 1 44 provides two candidate entries, either of which may be the address tag corresponding to the data or instruction that the microprocessor needs at that time. Cache data RAM 48 also receives the index that cache tag RAM 18 receives. At comparators 38 and 40, comparisons occur between the candidate physical address tags coming from BANK 0 and BANK 1, respectively, and the physical page number coming from physical address generator 34. If a match occurs in comparators 38 or 40, then the data in either BANK 0 50 or BANK 1 52, respectively, of cache data RAM 48 is the data that microprocessor needs. Otherwise, a cache miss occurs and the cache controller must fetch the data from the main memory system and load it into the cache.

The purpose of MMU/cache circuit 10 is to increase the speed of the associated microprocessor by rapidly providing to the microprocessor recently-used data or instructions. The operation of MMU/cache circuit 10 establishes a critical time path that determines the associated microprocessor performance. Any successful effort to increase the speed of the associated microprocessor usually requires an increase in the speed of MMU/cache circuit 10. Generally, the critical timing path consists of two elements. The first element is the path that begins as MMU 12 receives a virtual address and ends with MMU 12 providing physical page number 36. The second element is the path that begins as cache 14 receives the physical page number 36 and ends as the cache outputs cache data. The timing path includes TLB CAM 20, physical address generator 34, comparators 38 and 40, and gates 54, 56, and 64.

Figure 2:
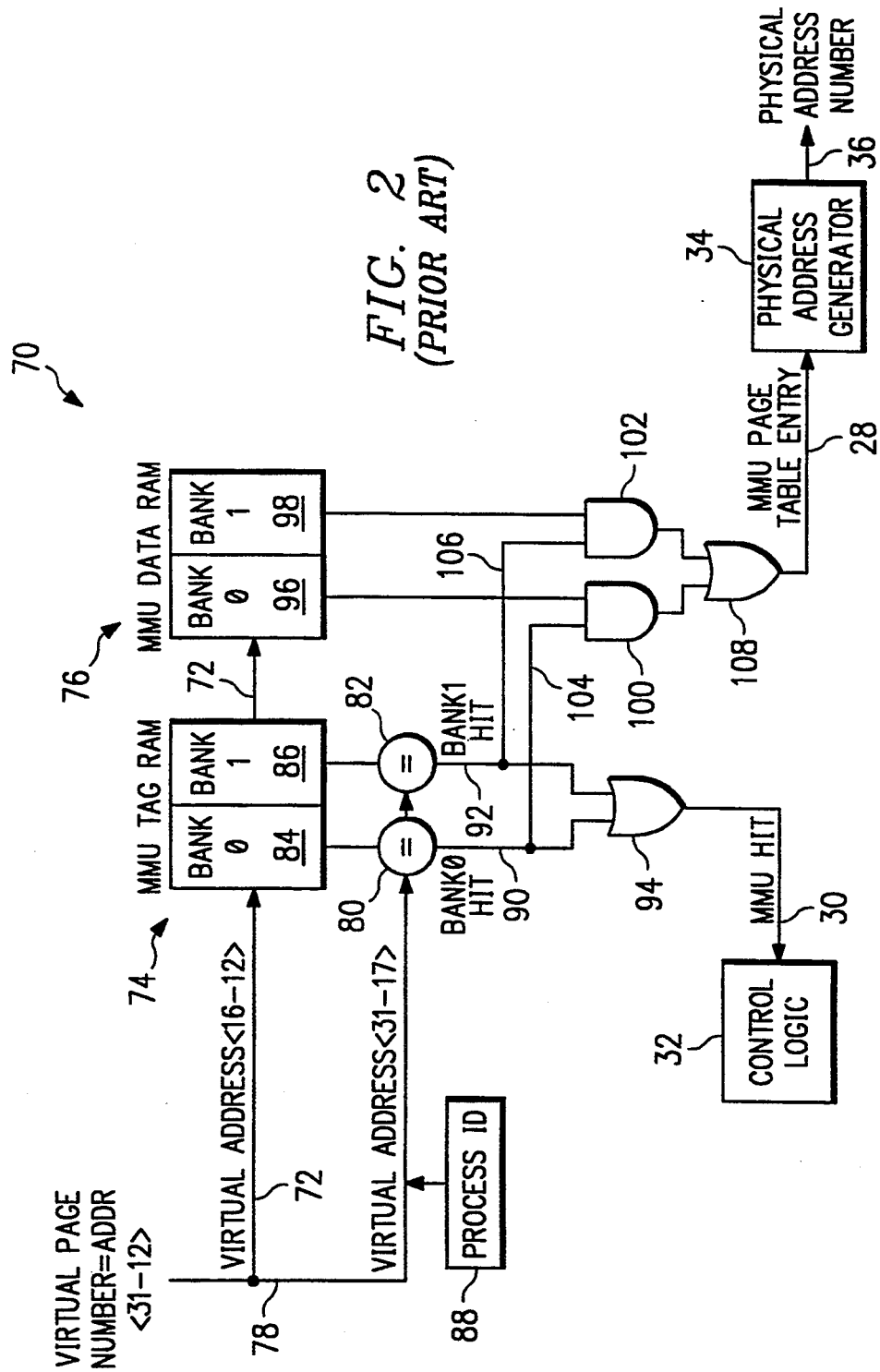
FIG. 2 shows a two-way set-associative memory management unit typical of that found in the prior art.

A different implementation of TLB CAM 20 appears in FIG. 2. This example is of a 64-entry two-way set-associative TLB. Other TLB configurations may work equally well. Instead of the fully-associative cache of TLB CAM 20, FIG. 2 shows a two-way set-associative cache 70 that may replace TLB CAM 20. In two-way set-associative cache 70, a virtual page number comes from the microprocessor. The bottom 5 bits of the virtual page number are sent via line 72 to MMU tag RAM 74 and MMU data RAM 76. The top 15 bits of the virtual page number then go via line 78 to comparators 80 and 82. Comparator circuits 80 and 82 receive tag addresses from BANK 0 84 and BANK 1 86 to match with the virtual addresses of the top 15 bits from line 78. Process ID 88 provides input along line 78 to comparators 80 and 82. BANK 0 hit data comes from comparator 80 at line 90, while BANK 1 hit signals come from comparator 82 on line 92. These signals go directly to OR gate 94 which feeds to control logic 32. MMU data BANK 0 96 and BANK 1 98 feed into AND gates 100 and 102, respectively. AND gates 100 and 102 receive hit signals from lines 90 for BANK 0 hits and line 92 for BANK 1 hits, respectively, via line 104 and 106. Outputs from AND gates 100 and 102 goes through OR gate 108 as a page table entry on line 28 to physical address generator 34. Physical address generator 34 produces a physical page number on line 36 that cache 14 can use to match with comparators 38 and 40 (see FIGURE 1).

In two-way set-associative MMU 70, the storage size of MMU tag RAM 74 and MMU data RAM 76 may be the same size as the cache within TLB CAM 20. However, the two-way set-associative MMU may be slightly faster or smaller in area on an integrated circuit. This configuration, however, does little to solve the problem of MMU 70 being the critical timing path for cache data output.

With a view to both FIGS. 1 and 2, it is clear that for cache data output, the first process of stripping off the bottom 12 bits of the virtual address and sending those bits to cache 14 starts cache tag RAM 18 and cache data RAM 48 on their way accessing the necessary data or instructions. They begin their access essentially at time 0 with respect to the cache data memory transaction. The top 20 bits, for example, in a 32-bit application, which are the page offset bits, suffer a delay going through the TLB CAM 20 or TLB 70 in order to generate the physical page number. As a result, the physical page number may not be at comparators 38 and 40 at the same time as the cache tag addresses from cache tag RAM BANK 0 42 and cache tag RAM BANK 1 44. In fact, physical page numbers almost certainly will not be to comparators 38 and 40 in time to avoid physical page number generation being the critical timing path for the cache data memory transaction. As a result, neither the fully associative TLB CAM 20 of FIG. 1 or the two-way set-associative TLB 70 of FIG. 3 solve the problem of reducing the critical time path for a cache data memory transaction.

Figure 3:
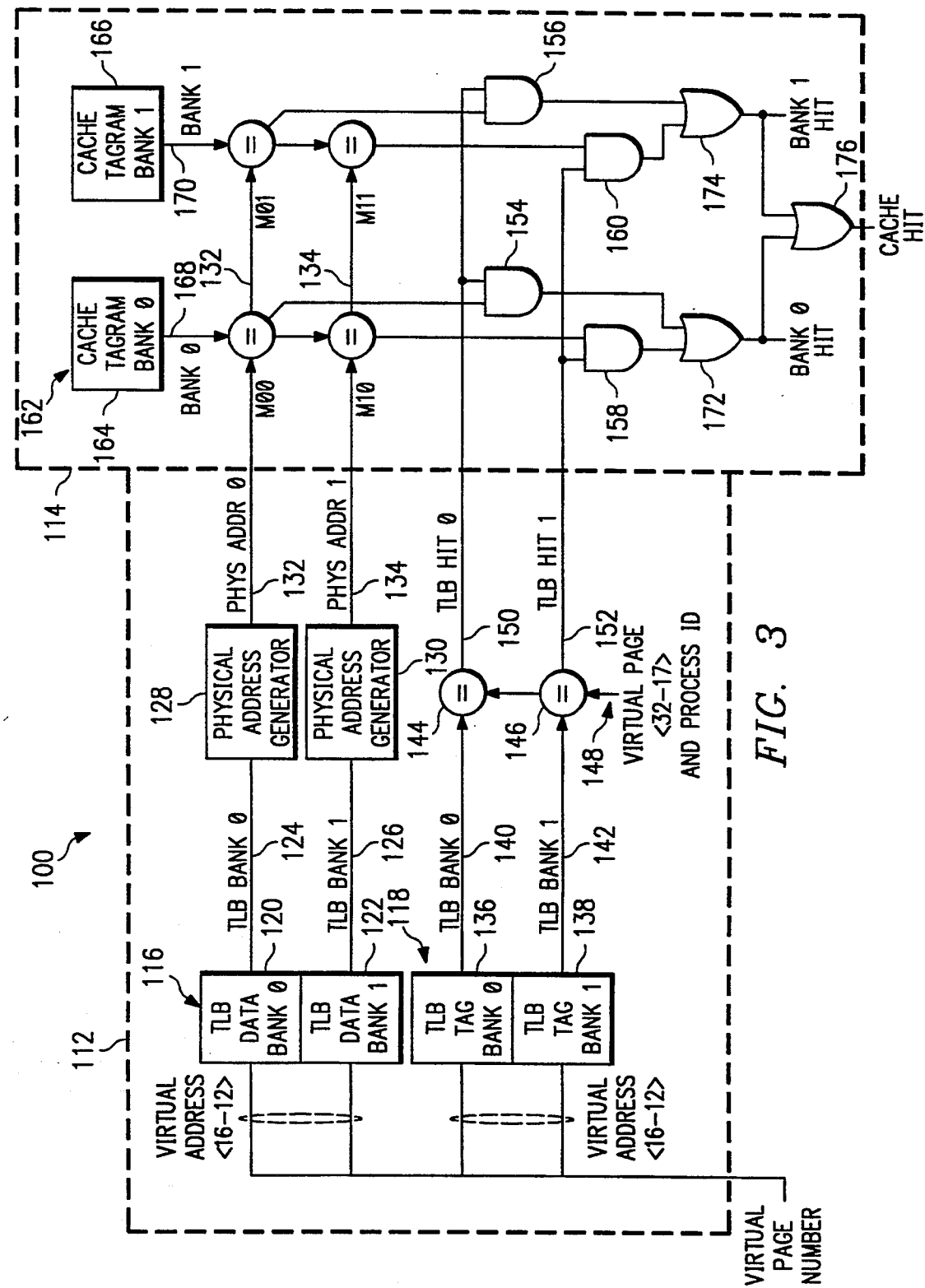
FIG. 3 provides a simplified schematic diagram of the preferred embodiment of the present invention.

The preferred embodiment shown in FIG. 3 illustrates how the present invention overcomes this timing limitation. The preferred embodiment uses a two-way set-associative TLB. Using a two-way set-associative TLB makes it possible to produce two candidate physical addresses, one from each set. Both of these candidate addresses may be sent over to cache 114. In the two-way set-associative cache, each of the two address tag outputs from the cache RAM must be compared with each of the two candidate physical addresses. This means that the cache tag comparator circuits 38 and 40 (See FIG. 1), for example, are duplicated to a yield a total of four address comparators. For each cache set, the two candidate match signals are finally gated by the TLB match signals for each TLB set 150 and 152 and combined into a single match or hit signal.

To illustrate how the preferred embodiment accomplishes the objects of the present invention, FIG. 3 shows the MMU/cache circuit of the present invention that includes MMU 112 and cache 114. MMU 112 includes TLB data RAM 116 and TLB tag RAM 118. TLB data RAM comprises TLB data RAM BANK 0 120 and TLB data RAM BANK 1 122. TLB data RAM BANK 0 120 and TLB data RAM BANK 1 122 receive virtual address bits 16-12. The PTEs that are output from TLB data RAM BANK 0 120 and TLB data RAM BANK 1 122, respectively, go to lines 124 and 126 as respective inputs to physical address generators 128 and 130. Output from physical address generators 128 and 130, respectively, go along lines 132 and 134 as PHYS ADDR 0 and PHYS ADDR i physical address signals to cache 114. The PHYS ADDR 0 signal goes to comparator M00 and comparator M01 in the preferred embodiment. Similarly, the PHYS ADDR 1 signal goes to comparator M10 and M11 of cache 114.

At the same time virtual address bits 16-12 go to TLB data RAM 116, these virtual address bits also go to TLB tag RAM 118. TLB tag RAM 118 includes BANK 0 136 and BANK 1 138. Tag addresses from BANK 0 136 and BANK 1 138, respectively, travel along lines 140 and 142 to comparators 144 and 146. Comparators 144 and 146 each receive virtual page bits 31 through 17 and process ID information from line 148. Hit signal from comparators 144 and 146 travel along lines 150 and 152 to cache 114. In cache 114, AND gates 154 and 156 receive TLB hit 0 signals from line 150, while AND gates 158 and 160 receive TLB hit 1 signals from line 152.

FIG. 3 shows cache tag RAM 162 of cache 114. Although the preferred embodiment also employs a cache data RAM similar to that of cache data RAM 48 within cache 14 of FIG. 1, for simplicity that portion of cache 114 does not appear in FIG. 3. Cache tag RAM 162 comprises BANK 0 164 and BANK 1 166. Address tags from BANK 0 164 go to comparators M00 and M10 via line 168. Similarly, addresses from BANK 1 166 go to comparator M01 and M11 via line 170. The hit signal from comparator M00 joins the TLB hit 0 signal at AND gate 154, the hit signal from comparator M01 and the TLB hit 0 signal go to AND gate 156. Similarly, the hit signal from comparator M10 joins the TLB hit 1 signal at AND gate 158, while the hit signal from comparator M11 joins the TLB hit 1 signal at AND gate 160. Signals from AND gates 154 and 158 go to OR gate 172, and signals from AND gates 156 and 160 go to OR gate 174. Gated output from OR gates 172 and 174 go to OR gate 176 as a cache hit output from cache 114. The BANK 0 hit and BANK 1 hit signals output from OR gate 172 and 174 are similar to the BANK 0 HIT and BANK 1 HIT outputs of lines 58 and 60 of FIG. 1.

A significant difference between typical prior art MMUs, (e.g., MMU 12 of FIG. 1) and MMU 112 of FIG. 3 is that TLB data RAM 116 and TLB tag RAM 118 form a two-way set-associative TLB that produces two candidate physical addresses, physical address 0 on line 132 and physical address 1 on 134, together with two TLB hit signals, TLB hit 0 on line 150 and TLB hit 1 on line 152 for delivery to the cache. TLB hit 0 and TLB hit 1 determine which one, if either of physical address 0 or physical address 1, is the correct candidate physical address to match with the cache tag RAM addresses from BANK 0 164 and BANK 1 166 of cache 114. The four comparisons that take place in comparators M00, M01, M10 and M11 all occur simultaneously with the MMU tag comparisons in comparators 144 and 146. By doing the two sets of comparisons for physical address 0 and physical address 1 and gating the comparison outputs with the two TLB hit signals, the preferred embodiment avoids the sequential physical address generation that occurs in known two-way associative TLBs such as TLB 70 of FIG. 2 or TLB CAM 20 of FIG. 1.

Instead of sending over a single physical address, MMU 112 sends over two physical addresses, because by doing so it is possible to avoid the need to sequentially determine the proper physical address before comparing the physical address to the address from cache tag RAM 162. This may occur subsequent to the comparison taking place in comparators M00, M01, M10 and M11. By simply using AND gates 154, 156, 158, and 160, respectively, parallel comparisons take place in the cache 114 comparators and parallel comparisons take place in the MMU 112 comparators which may more rapidly go to the AND gates 154, 156, 158, and 160. The parallel comparisons more rapidly produce BANK 0 hit and BANK 1 hit signals, from OR Gates 172 and 174 and cache hit signals from OR gate 176.

Figure 4:
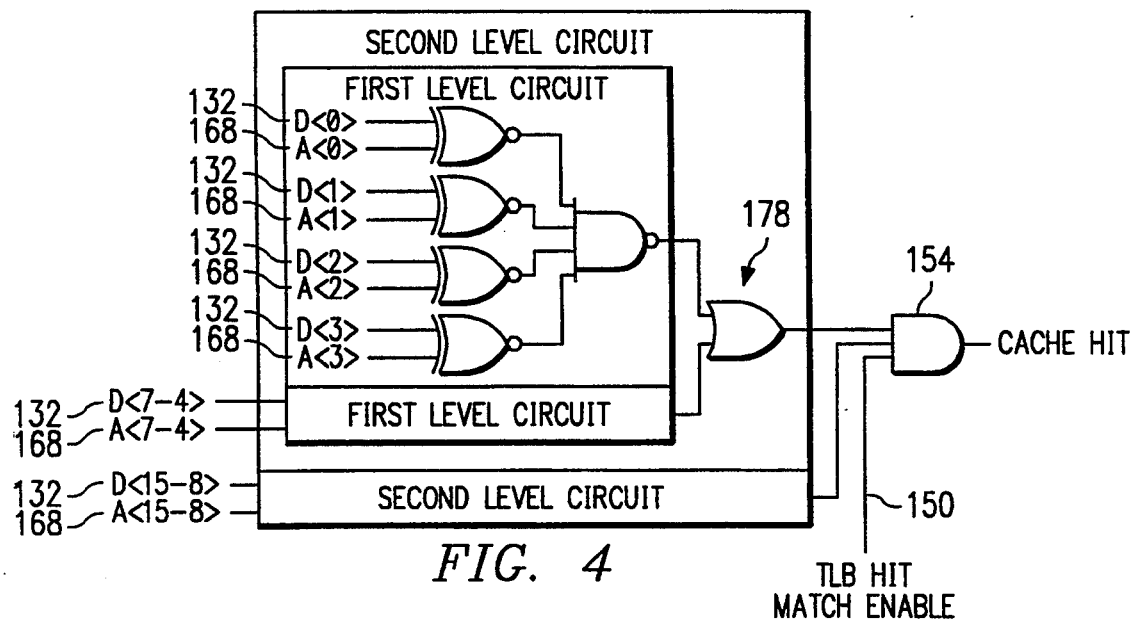
FIG. 4 illustrates a matching circuit that may be used with the preferred embodiment.

FIG. 4 provides an example of a 16-bit cache-tag comparator circuit with MMU-hit match enables. Simple static XNOR gates followed by an AND tree may be used to implement the cache match circuits. In the configuration of FIG. 4, the enabling of the cache hit by the TLB hit may be merged into the final layer of the AND tree 154. This eliminates the need for an extra stage of logic for this purpose.

Figure 5:
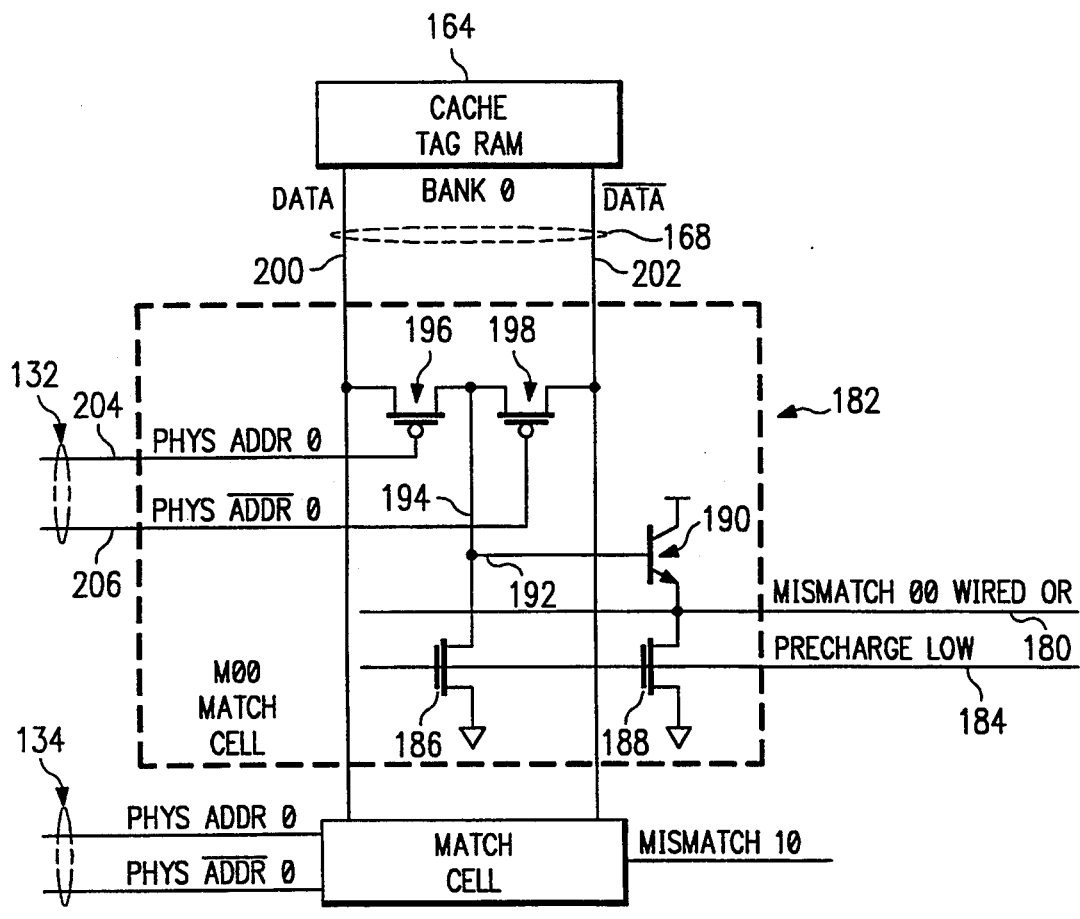
FIG. 5 provides a schematic diagram of a dynamic wired OR comparison circuit according to the preferred embodiment.

An alternative embodiment that can have a smaller delay time for the comparison operation appears in FIG. 5. FIG. 5 provides a circuit diagram of a typical dynamic wired OR tag comparator that may be used to implement the preferred embodiment. At MISMATCH 00 wired OR line 180, match cell 182 outputs a signal to indicate a mismatch between the candidate physical address from MMU 112 and the corresponding cache tag address of cache 114. Match cell 182 may, for example, be one of 20 match cells all with their mismatch 00 outputs connected to the common mismatch line 180. All these together form comparator M00 of FIG. 3. Precharge line 184 connects to the gates of N-channel transistors 186 and 188 to precharge the NPN transistors' base node 192 and emitter node 180 low. If a match occurs between the physical address from MMU 112 and the address of cache BANK 0 164 of cache 114, then MISMATCH 00 will remain low. Otherwise, the signal on MISMATCH 00 wire OR 180 will be pulled high by NPN transistor 190. With this design, it is possible to simply add more wired OR circuits to permit a wide fan in for the purpose of comparing numerous bits without significant delays in the comparison time.

Continuing with FIG. 5, the base 192 of NPN transistor 190 connects by line 194 to P-channel transistors 196 and 198. P-channel transistors 196 and 198 come from lines DATA 200 and $\overline{\text{DATA}}$ 202. Line $\overline{\text{DATA}}$ 202 and DATA 200 may, for example, together comprise line 168 of FIG. 3. At the gates of P-channel transistors 196 and 198 appear dual signals PHYS ADDR 0 on line 204 and PHYS $\overline{\text{ADDR}}$ 206. With this configuration, match cell 182 implements an exclusive OR gate.

Figure 6:
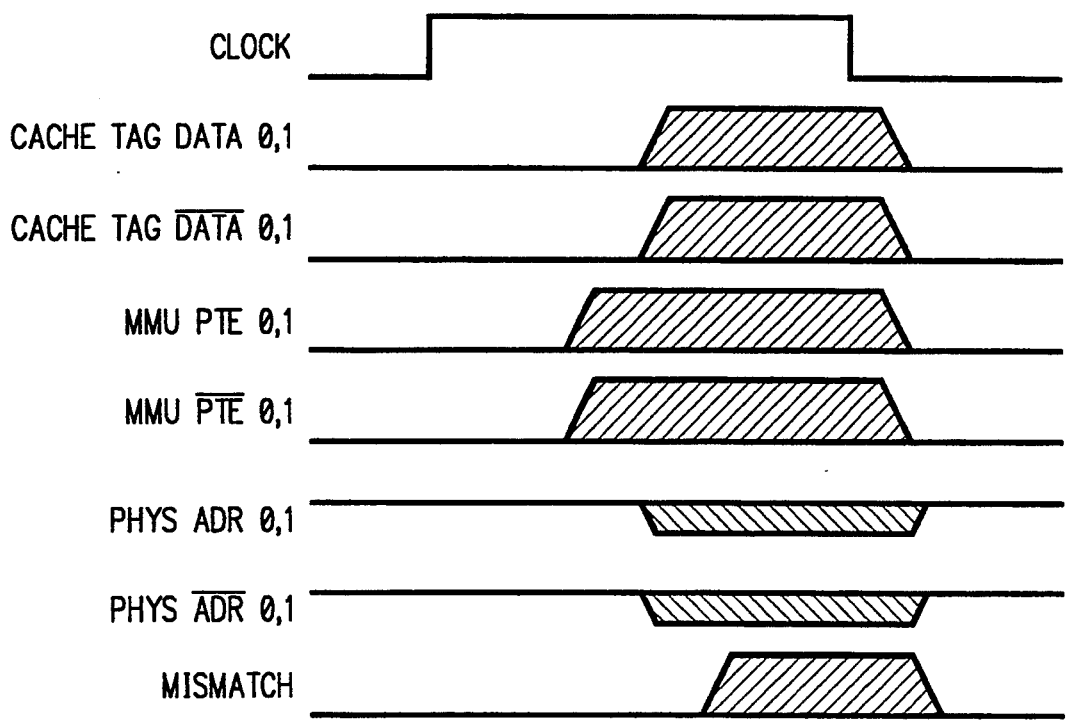
FIG. 6 contains a timing diagram of the FIG. 5 circuit.

The signals DATA and $\overline{\text{DATA}}$ on lines 200 and 202, respectively, begin low according to the timing diagram that appears at FIG. 6. After a clock signal, for example, either a signal on line DATA or a signal on line $\overline{\text{DATA}}$ may go high depending on whether the address bit in cache tag RAM Bank 0 164 is a 1 or 0 respectively. These two wires 200 and 202 together constitute dual-rail signals for Bank 0 Data 168. Suppose, for example, that the signal on line DATA goes high. Then, that signal goes to P-channel transistor 196. At its gate, P-channel transistor 196, also receives signal PHYS ADDR 0 at line 204. The dual-rail signals PHYS ADDR 0 and PHYS $\overline{\text{ADDR}}$ on lines 204 and 206, respectively begin high according to the timing diagram of FIG. 6. If the PHYS ADDR 0 signal on line 204 goes low and the signal on DATA line 200 goes high, then P-channel transistor 196 will turn on to send a signal to line 194 which will ultimately go to line 192 at the base of NPN transistor 190. NPN transistor 190 turns on when there is a mismatch between the signal on PHYS ADDR 0 line 204 and DATA line 200. The signal that goes to NPN transistor 190 pulls up line 180 and sends a mismatch signal from match cell 182. Similarly, if the signal on $\overline{\text{DATA}}$ line 202 goes high and the PHYS ADR 0 signal on line 206 goes low, this turns on transistor 198 to cause transistor 190 to pull up MISMATCH 0 line 180. This, again, sends a mismatch signal from match cell 182.

FIG. 6 shows the timing diagram of the MISMATCH 00 signal going high following the transmission of cache tag DATA or $\overline{\text{DATA}}$ and PHYS ADDR OR PHYS $\overline{\text{ADDR}}$. FIG. 6 also shows the dual-rail signals MMU PTE and $\overline{\text{PTE}}$ beginning low. One of these signals will go high. This causes PHYS ADDR or PHYS $\overline{\text{ADDR}}$ to go low as shown in the timing diagram. This implies that the logic of physical address generators 128 and 130 is inverting in nature. To use this comparator circuit, the MMU data RAM and cache tag RAM must each output dual-rail signals which begin low and selectively go high. The design of such RAMs is known to those skilled in the art.

A typical two-way set-associative cache such as cache 10 of FIG. 1, for example, contains one of these match cells for each address tag bit of each set. The preferred embodiment of the present invention, however, for each bit will have two match cells 182. One match cell will be part of comparator M00, for example, to receive the bit coming from physical address generator 128 of FIG. 3. Additionally, PHYS ADDR 1 coming from physical address generator 130 provides a physical address input for match cells constituting comparator M10. In essence, therefore, by providing two TLB data RAMs, TLB BANK 0 120 and TLB BANK 1 122, the preferred embodiment uses two comparators from each BANK of cache tag RAM 162.

Figure 7:
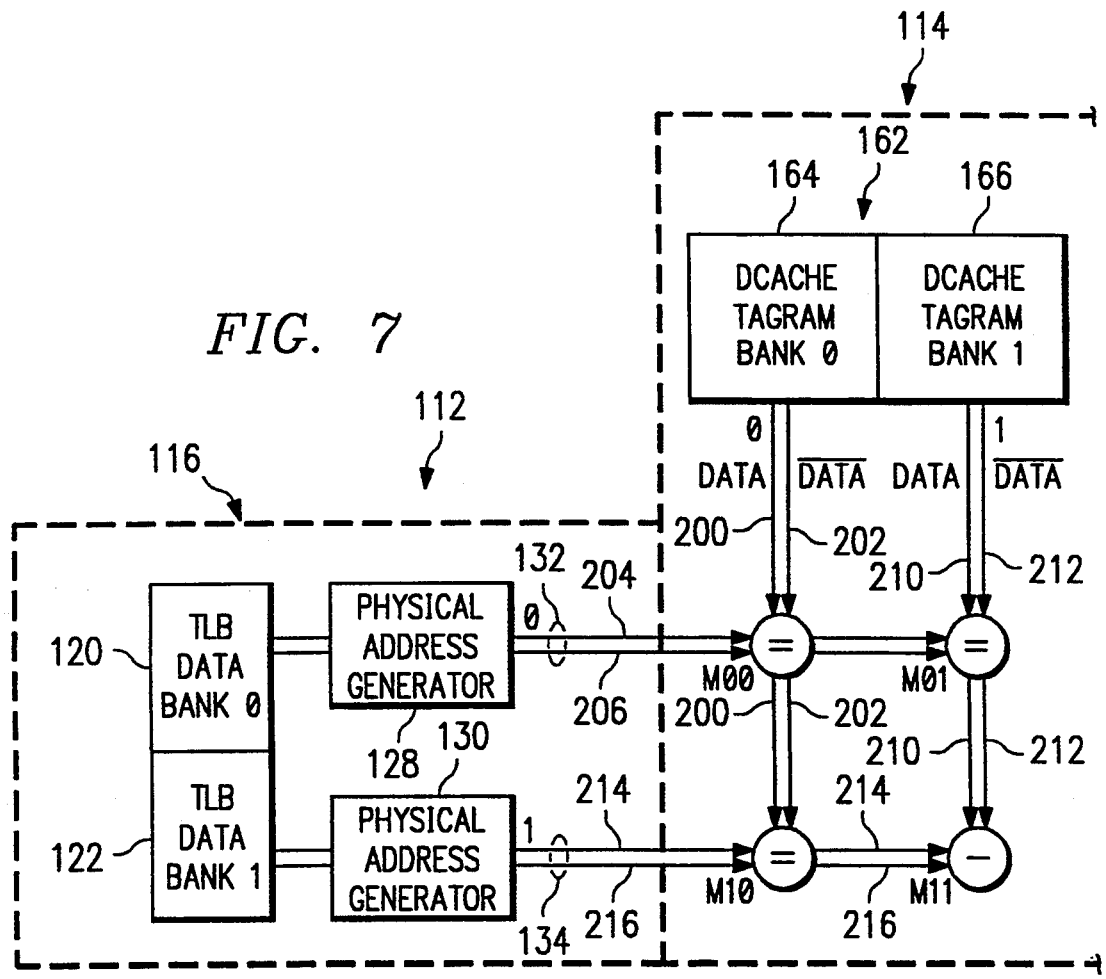
FIG. 7 illustrates in a block diagram a basic cache-tag comparator circuit with memory management unit (MMU) to implement dual rail logic in the preferred embodiment.

FIG. 7 illustrates an embodiment using the dual rail comparator circuit of FIGS. 5 and 6. In application, to use the dynamic circuits of FIG. 5 and 6 it is necessary to design a circuit to send both PHYS ADDR 0 and PHYS $\overline{\text{ADDR}}$ 0 signals to the match cells of comparator M00. For example, FIG. 7 shows cache tag RAM 162 comprising BANK 0 164 and BANK 1 166. Coming from BANK 0 164 are lines DATA 200 and $\overline{\text{DATA}}$ 202 to comparator M00 and comparator M10. PHYS ADDR 0 line 204 and PHYS $\overline{\text{ADDR}}$ 0 206 go to comparators M00 and M01. In similar fashion, from BANK 1 166 line DATA 210 and $\overline{\text{DATA}}$ 212 go to comparators M01 and M11. Finally, in the example of FIG. 7, lines PHYS ADDR 1 214 and PHYS ADDR 1 216 go to comparators M10 and M11.

While FIG. 7 shows the dual-rail comparators implementing the four comparators M00, M01, M10 and M11 of FIG. 3, they may also be used to implement the address tag comparators 194 and 196 within MMU 112.

By implementing the dual rail two-way set-associative MMU in conjunction with the two-way set-associative cache tag RAM, the preferred embodiment provides parallel signal flow where, heretofore, only sequential signal flow occurred. Moreover, the parallel signal flow eliminates or significantly reduces the time necessary for the physical address signals from MMU 112 to reach the cache 114 of FIG. 3. This eliminates a waiting time inherent in known MMU/cache comparator circuits and may significantly improve the performance of an associated microprocessor.

Figure 8:
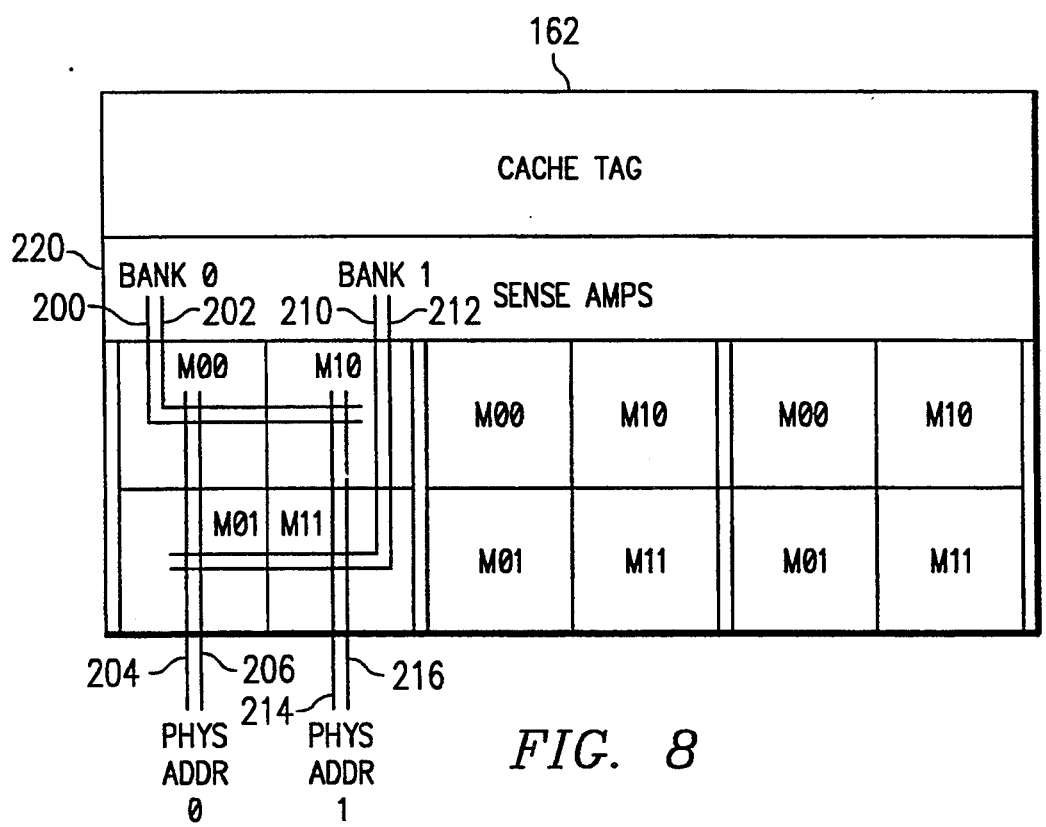
FIGS. 8 and 9 illustrate exemplary configurations for implementing the preferred embodiment.

FIG. 8 provides a layout block diagram of an exemplary application of the preferred embodiment. For example, associated with cache tag RAM cells 162 may be sense amps 220 that associate with cache BANK 0 and cache BANK 1 for sense application. Coming from sense amp 220 may be DATA line 200 and DATA line 202 to comparators M00 and M10 and DATA line 210 and DATA line 212 to comparators M01 and M11. PHYS ADDR 0 and PHYS ADDR 1 may go to the comparator circuit with line PHYS ADDR 0 204 and line PHYS ADDR 0 206 to match cells M00 and M01. Likewise, PHYS ADDR 1 line 214 and PHYS ADDR line 216 go to memory cells M10 and M11.

Typical prior art cache tag RAM's include a single row of comparators next to the row of sense amps. This row would include the equivalent of comparators M00 and M01 to compare the address tag outputs of bank 0 and bank 1 respectively with a single physical address. The configuration of FIG. 8, likewise, shows how match cells M00, M10, M01 and M11 may also be built next to sense amps 220 that associate with cache tag 162. For each bit that cache tag 114 will compare to a physical address appears four comparators M00, M10, M01 and M11. For example, for a 32-bit comparator circuit 32 of the small 2-by-2 blocks will be repeated throughout the comparator circuit. The double lines going into each of the match cells exhibits the dual rail logic that FIGS. 5 and 6 describe. Although not shown in FIG. 8, four match lines may pass through all the match cells, two match lines through the top match cells, M00 and M10, and two for the bottom match cells M01 and M11. These would be the lines that function as MISMATCH 00 line 180 (FIG. 4), which eventually go to the respective AND for the four comparators M00, M01, M10 and M11, gates 154, 156, 158 and 160 of FIG. 3. The result is a compact layout design for implementing the preferred embodiment of the present invention on an integrated circuit.

Figure 9:
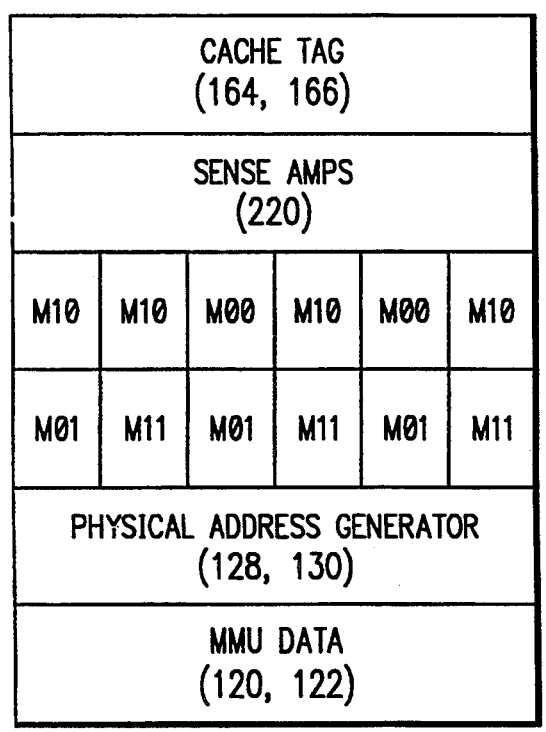

FIG. 9 shows a layout diagram showing how the MMU data RAMs 120 and 122, the physical address generators 128 and 130, the cache tag RAM's 164 and 166 with their sense amps, and the comparators M00, M01, M10 and M11 may be arranged on an integrated circuit. The cache tag RAM cells, their sense amps and comparators are arranged as in FIG. 8. Below them is a row of circuits which implement the physical address generators. Below the physical address generators are the MMU data RAM's and their sense amps.

Although an embodiment has been described which uses two-way set-associative MMU's and caches, this invention applies equally well to four-way, eight-way or other types of set-associative caches. Although a particular dynamic logic wired-OR comparator has been described here, this invention could use any of the many comparator circuits known to those skilled in the art. Although this invention has been illustrated using 32 bit virtual-to-physical address with a 4K byte page sizes it can easily be generalized to other size pages.

Although the invention has been described with reference to the above-specified embodiments, this description is not meant to be construed in a limiting sense. Various modifications of the disclosed embodiment, as well as alternative embodiments of the invention will become apparent to persons skilled in the art upon reference to the above description. For example, many practical details of caches and MMU's have been omitted for simplicity. These include control logic, storage and processing of valid bits, and datapaths and control logic to fill these units from main memory when misses occur. It is, therefore, contemplated that the appended claims will cover such modifications that fall within the true scope of the invention.

What is claimed is:

1. A circuit for high-speed virtual-to-physical address translation and cache tag matching, comprising:
    circuitry including an N-way set-associative memory for producing a first predetermined plural number, N, of candidate physical addresses and N candidate address hit signals which respectively indicate whether or not said candidate physical addresses are qualified for cache tag matching;
    an M-way set-associative cache for producing a second predetermined number, M, of address tags;
    comparison circuitry for comparing each of said N candidate physical addresses with each of said M address tags; and
    circuitry responsive to said N candidate address hit signals and said comparison circuitry for indicating when a qualified candidate physical address matches one of said address tags.

2. The circuit of claim 1, wherein said set-associative memory comprises a two-way set-associative memory for producing two candidate physical addresses.

3. The circuit of claim 2, wherein said set-associative cache comprises a two-way set-associative cache for producing two address tags.

4. The circuit of claim 1, wherein said set-associative cache comprises a two-way set-associative cache for producing two address tags.

5. The circuit of claim 1, wherein said comparison circuitry comprises a plurality of comparison circuits having a wired-OR output.

6. The circuit of claim 1, wherein said circuitry for producing comprises a plurality of address tag comparators, said address tag comparators further comprising wired OR outputs.

7. The circuit of claim 1, wherein said comparison circuitry includes an N-by-M array of comparison circuits.

8. The circuit of claim 7, wherein said cache includes a cache tag random access memory from which said cache tags are produced.

9. The circuit of claim 8, wherein said comparison circuits are connected to said cache tag random access memory.

10. The circuit of claim 1, wherein said comparison circuitry includes a dual rail logic input.

11. The circuit of claim 10, further comprising dual rail logic circuitry to input said candidate physical address signals to said comparison circuit input.

12. A method for high-speed virtual-to-physical address translation and cache tag matching, comprising the steps of:

producing a first predetermined plural number, N, of candidate physical addresses;

producing a second predetermined number, M, of address tags;

comparing each of said N candidate physical addresses with each of said M address tags;

generating N candidate address hit signals which respectively indicate whether or not said candidate physical addresses are qualified for cache tag matching; and indicating, in response to said comparing step and said N candidate address hit signals, when a qualified candidate physical address matches one of said address tags.

13. The method of claim 12, wherein N=2 and the step of producing two candidate physical addresses includes using a two-way set-associative translation lookaside buffer.

14. The method of claim 13 wherein M=2 and the step of producing address tags includes using a two-way set-associative cache.

15. The method of claim 12, wherein m=2 and the step of producing two address tags includes using a two-way set-associative cache.

16. The method of claim 12, further comprising the step of comparing said candidate physical addresses with said address tags using a dynamic-wired OR comparison circuit.

17. The method of claim 12, further comprising the step of comparing input virtual addresses to virtual address tags stored within an associative memory management unit, including using a wired OR comparison circuit.

18. The method of claim 12, wherein said comparing step includes using a comparison circuit having a dual rail logic input.

19. The method of claim 18, further comprising the step of directing said candidate physical address signals to said comparison circuit using dual rail logic.

* * * * *